United States Patent [19]
Bourbeau

[11] Patent Number: 4,789,056
[45] Date of Patent: Dec. 6, 1988

[54] SLIDER BED CONVEYOR APPARATUS AND ASSOCIATED METHOD

[75] Inventor: Robert D. Bourbeau, Export, Pa.

[73] Assignee: Solidur Plastics Co., Pittsburgh, Pa.

[21] Appl. No.: 10,409

[22] Filed: Feb. 3, 1987

[51] Int. Cl.$^4$ .............................................. B65G 15/60
[52] U.S. Cl. .................................. 198/823; 198/841; 198/842; 198/861.1
[58] Field of Search ............... 198/841, 823, 830, 842, 198/861.1, 816, 818, 820, 821, 824; 193/35 R, 35.55

[56] References Cited

U.S. PATENT DOCUMENTS

| | | | |
|---|---|---|---|
| 809,227 | 1/1906 | Steckel | 198/826 |
| 2,584,288 | 2/1952 | Przybylski | 198/191 |
| 2,731,138 | 1/1956 | Parisi | 198/204 |
| 2,851,150 | 9/1958 | Boersma | 198/186 |
| 3,200,940 | 8/1965 | Higgins | 198/192 |
| 3,877,568 | 4/1975 | Breiling et al. | 198/842 |
| 4,215,776 | 8/1980 | Esler | 198/841 X |
| 4,280,619 | 7/1981 | Ward et al. | 198/823 |

FOREIGN PATENT DOCUMENTS

| | | | |
|---|---|---|---|
| 801749 | 1/1951 | Fed. Rep. of Germany | 198/818 |
| 2447868 | 4/1976 | Fed. Rep. of Germany | 198/842 |
| 602423 | 4/1978 | U.S.S.R. | 198/823 |
| 2167369 | 5/1986 | United Kingdom | 198/818 |

Primary Examiner—Frank E. Werner
Assistant Examiner—D. Glenn Dayoan
Attorney, Agent, or Firm—Arnold B. Silverman

[57] ABSTRACT

A slider bed conveyor apparatus and associated method comprising a conveyor belt system having a frame, a slider bed and head and tail idler rollers on either end of the slider bed that are secured to and in recessed position to the slider bed and a conveyor belt running over the idler rollers. When loads such as impact loads are placed on the conveyor belt, the slider bed supports the conveyor belt at the point where the material is loaded. This action resists sagging and stretching of the conveyor belt and also reduces wear on the idler rollers. The idler rollers are each mounted on a shaft and are adapted to be vertically adjustable depending on load requirements. The conveyor belt system is modular and of unitary structure and several modules can be joined so as to form a conveyor belt system of any desired length.

9 Claims, 3 Drawing Sheets

SLIDER BED CONVEYOR APPARATUS AND ASSOCIATED METHOD

BACKGROUND OF THE INVENTION

1. Field of the Invention

This invention relates to a slider bed conveyor belt system and more specifically to a system that increases the useful life of a conveyor belt on a conveyor belt system by providing better support for the conveyor belt due to a slider bed working in conjunction with a plurality of idler rollers.

2. Description of the Prior Art

A recurring problem with conveyor belt systems is that the conveyor belt can become worn and stretched due to the forces of impact loads being deposited on the conveyor belt. The forces cause the conveyor belt to sag and stretch. These forces are also transferred to the idler rollers causing the bearings and rollers to become worn.

U.S. Pat. No. 3,200,940 discloses a belt conveyor wherein a belt rests on a roller assembly mounted on telescopic spindles that allow the rollers to assume a deeper troughing angle. This deeper troughing angle brings the belt into frictional contact with a tray and two oppositely inclined plates. The patent discloses that this action acts to brake or retard the movement of the belt under gravity when the belt is loaded with material, but discloses nothing about how the load is supported or how the life of the belt is increased.

U.S. Pat. No. 2,584,288 discloses a belt that slidably rests on a sheet metal deck. This system, however, increases frictional contact on the underside of the belt, thereby causing the belt to wear.

U.S. Pat. No. 2,731,138 discloses a conveyor belt that rests on idler rollers, transverse support struts, and two side plate members. The problem of belt sagging, although somewhat alleviated by the transverse support struts, still exists.

U.S. Pat. No. 2,731,138 also discloses a modular belt conveyor system. That is, several units can be joined to form a longer belt conveyor system. A modular system is also disclosed in U.S. Pat. No. 2,851,150.

In spite of these known conveyor systems, there remains a need for a conveyor belt system that is designed to both increase the efficiency of the conveyor and the useful life of the conveyor belt. There remains a need for a conveyor belt system that resists particle wear of the conveyor belt by distributing and supporting loads placed on the conveyor belt. There also remains a need to have adjustable idler rollers to accommodate different load sizes to further relieve load pressure on the idler rollers and conveyor belt.

SUMMARY OF THE INVENTION

The present invention has produced a solution to the above-described needs by providing a design of a conveyor belt system that increases the useful life of the conveyor belt. The conveyor belt system is a modular and unitary structure comprised of a frame, a slider bed mounted on a frame, and idler rollers mounted adjacent each end of the slider bed. An endless conveyor belt runs over and contacts the idler rollers. When impact loads are placed on the conveyor belt, the conveyor belt is supported not only by the idler rollers, but also by the slider bed. The idler rollers are preferably vertically adjustable by means of a series of jack screws that compensate for particular use and loading conditions. The idler rollers are preferably mounted on shafts, as opposed to bearings of the prior art.

It is an object of the present invention to provide an improved modular slider bed conveyor apparatus having integral idler rollers and an associated method.

It is an object of the present invention to increase the useful life of the conveyor belt by providing support for the belt to resist sagging of the belt due to uneven or impact loads.

It is a further object of the present invention to provide a slider bed that supports the conveyor belt when loaded.

It is a further object of the present invention to provide vertical adjustability of the idler rollers by means of jack screws to accommodate efficiently different loads to further relieve load pressure on the idler rollers, bearings surfaces, and conveyor belt.

It is a further object of the invention to provide mounting for the idler rollers on a shaft as opposed to a bearing.

It is a further object of the invention to treat the belt with a substance that reduces wear and tear on the bearing surface.

It is a further object of the present invention to provide an improved method of conveying materials which may advantageously employ a frame supporting a slider bed and a plurality of idler rollers in cooperation therewith.

These and other objects of the invention will be fully understood from the following description of the invention with reference to the illustrations appended hereto.

DESCRIPTION OF THE PREFERRED EMBODIMENTS

Figure 1:
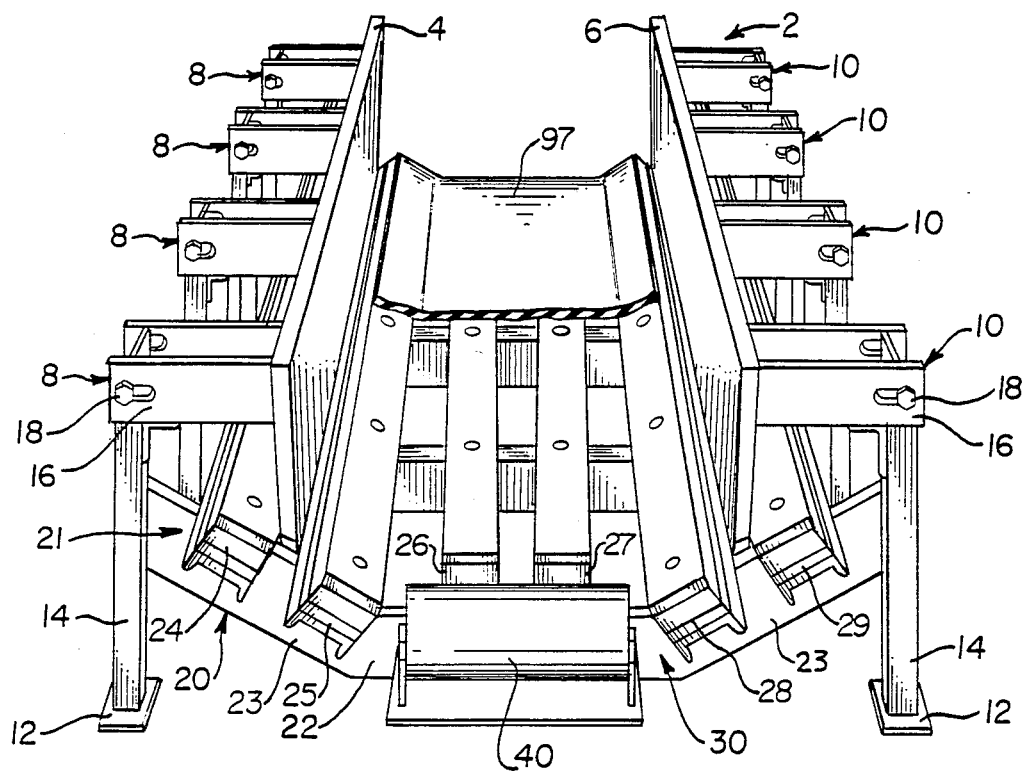
FIG. 1 is a perspective view of the conveyor belt system.

Referring to FIG. 1, there is shown a perspective view of an embodiment of a modular section of the conveyor belt system 2. The conveyor belt system 2 is a unitary structure, with each modular section preferably approximately ten feet in length and four feet in height. It will be appreciated that several of the modular sections can be combined to form a longer conveyor system.

The particular embodiment shown in FIG. 1 has a pair of spaced opposed generally vertically oriented side panel members 4,6 having generally laterally outwardly projecting support members 8,10. The generally L-shaped supports 8,10 have a foot 12, a vertical member 14, and a horizontal member 16. The vertical member 14 in the form shown is bolted to the horizontal member 16, so as to form a right angle at the connection point 18. The horizontal members 16 are in turn attached to the side panel members 4,6. Also attached to the vertical members 14 are frame members 20. The frame 21, therefore, is formed by the side panel members 4,6, the support members 8,10, and frame members 20 associated with each of the support members 8,10. The frame members 20 may be approximately six feet in length, for example, and contain a generally horizontal section 22 and two sections 23 angled generally with respect to the horizontal section 22. Longitudinal support members 24,25,26,27,28, and 29 are disposed on the upper end of the frame members 20.

Figure 2:
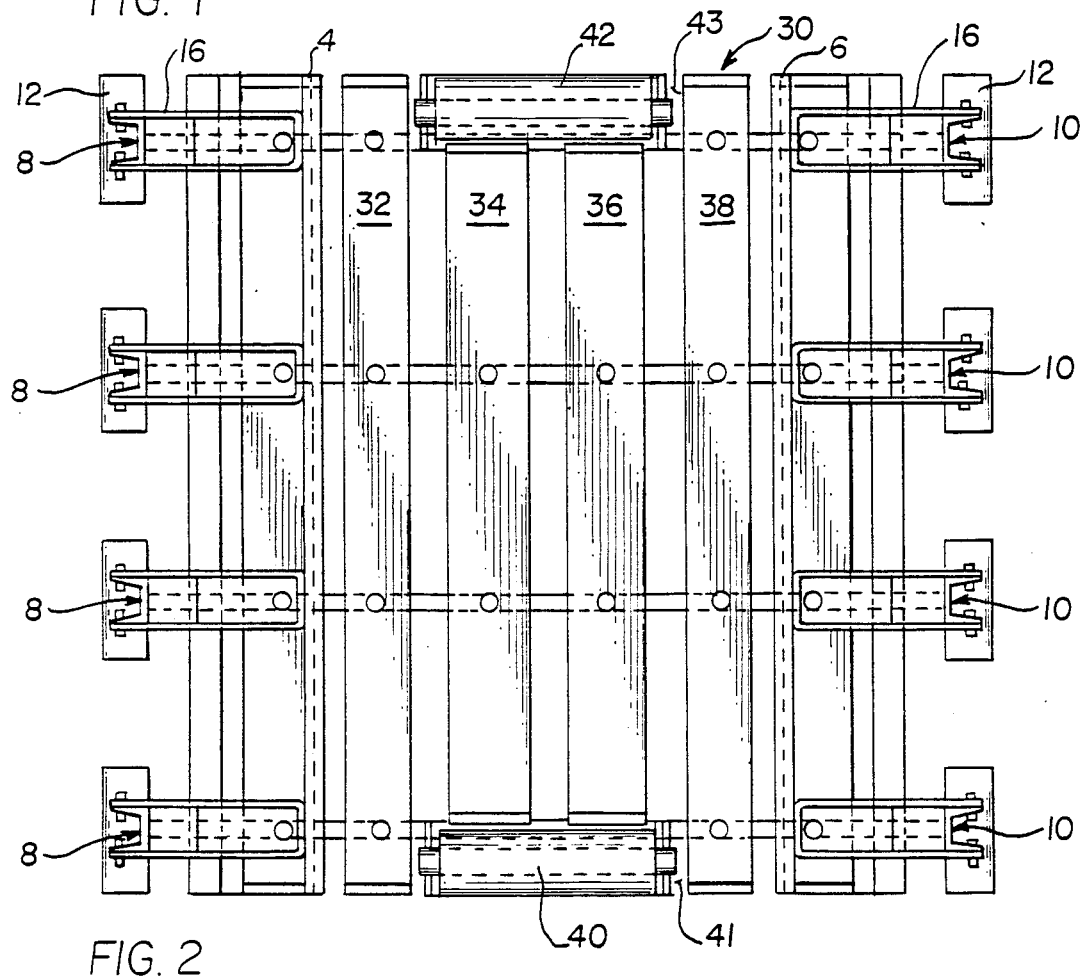
FIG. 2 is a top plan view of the conveyor belt system.

The slider bed 30, which can best be seen in FIG. 2, preferably is composed of four slider bed members 32, 34, 36, 38 in the form shown. The side slider bed members 32, 38 are mounted on their respective longitudinal support members 25,28 (FIG. 1) which are in turn mounted on the generally angled sections 23 of the frame members 20. The flat slider bed members 34,36 are mounted on their respective longitudinal support members 26,27 which are in turn mounted on the generally horizontal section 22 of the frame member 20. It can be appreciated that the slider bed 30 can be fabricated to any desirable length and width.

Figure 3:
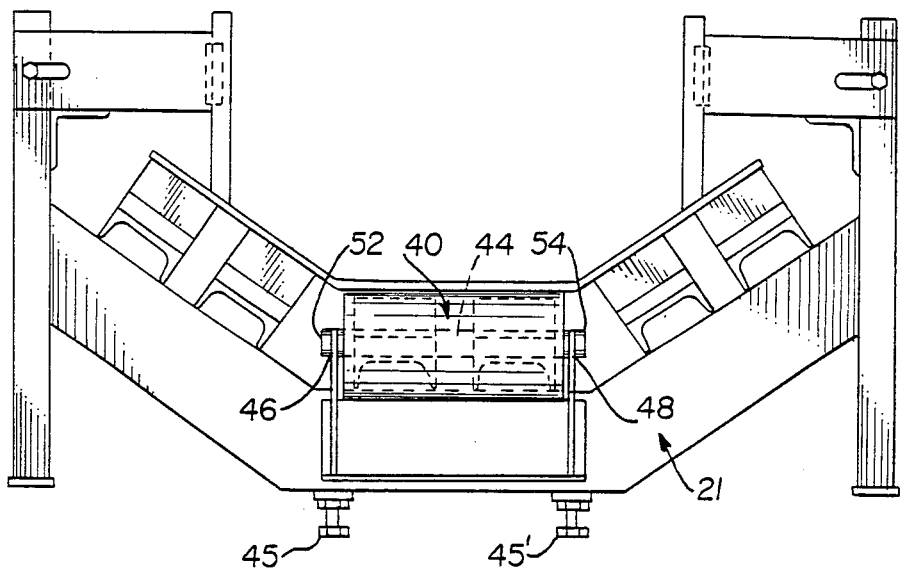
FIG. 3 is a front elevational view of the conveyor belt system showing the idler roller.

Referring to FIGS. 1 and 2, a head idler roller 40 and a tail idler roller 42 are rotatably mounted respectively at the head and tail end of the slider bed 30, on the frame member 21. The idler rollers 40,42 are preferably designed to be easily removable and are recessed in respect to the slider bed 30. It will be noted that the side slider bed members 32,38 are longer than the flat slider bed members 34,36 thus creating recesses 41,43 in the slider bed 30. As can best be seen in FIG. 3, the head idler roller 40 (shown in chain line drawing) is rotatable with respect to shaft 44 which extends beyond the sides of the idler roller 40. The shaft ends 46,48 are provided with roller bearing cups 52,54 which allow the shaft 44 to rotate while holding idler roller 40 in place. The idler roller 40 is vertically adjustable with respect to the frame 21 and slider bed 30 by means of jack screws 45 and 45'. This permits adjustment of the elevation of belt contacting surface of the idler rollers 40,42 with respect to the elevation of the slider bed 30. This feature of the apparatus will be described in greater detail hereinafter in connection with the discussion of FIGS. 4 and 5.

Figure 4:
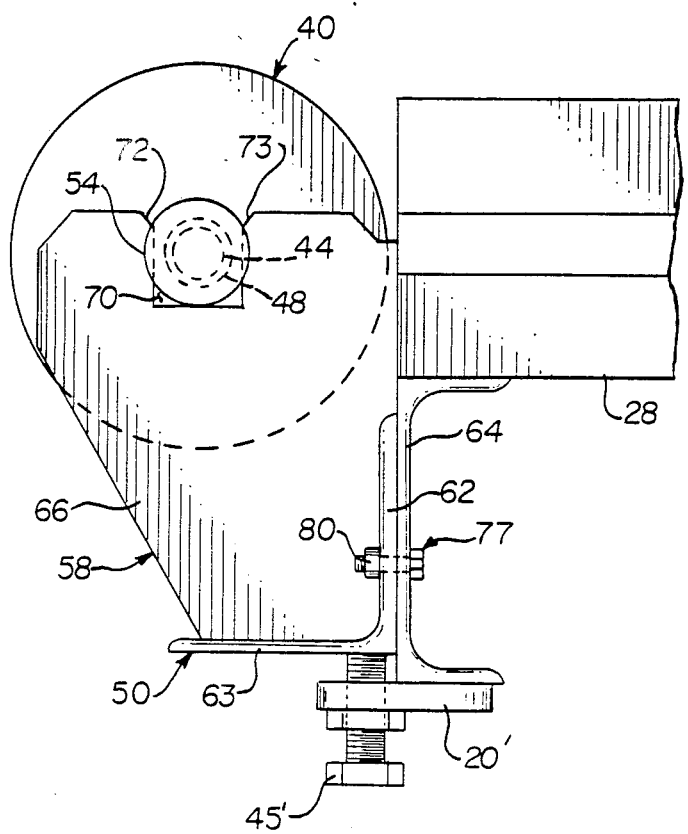
FIG. 4 is a side elevational view of the idler roller and the idler roller support mechanism.

As can be seen in FIG. 4, the idler roller 40 is supported by an adjustable idler roller support 58. The adjustable idler roller support 58 has a generally vertically oriented leg 62 and generally horizontally projecting leg 63 which is in generally spaced underlying relationship with the idler roller 40. A bracket support 64 secures the adjustable idler roller support 58 through generally vertically oriented leg 62 to the frame 21 and 20' through support member 28. The adjustable idler roller support also consists of a pair of identical vertical support plates 65,66 which are perpendicular to the vertically oriented leg 62 and are supported by the generally horizontally projecting leg 63 and relatively spaced a distance greater than the axial length of the idler roller 40. The support plate 66 shown in FIG. 4, has a generally upwardly open recess, such as recess 70 which receives the end 48 of the shaft 44 and the roller bearing 54 attached to the end 48 of the shaft 44. As is shown in FIG. 4, the support plate 66 has a pair of pilot edges 72,73 adjacent to the recess 70 in order to facilitate insertion of the shaft end 48 and roller bearing cup 54 into the recess 70.

Figure 5:
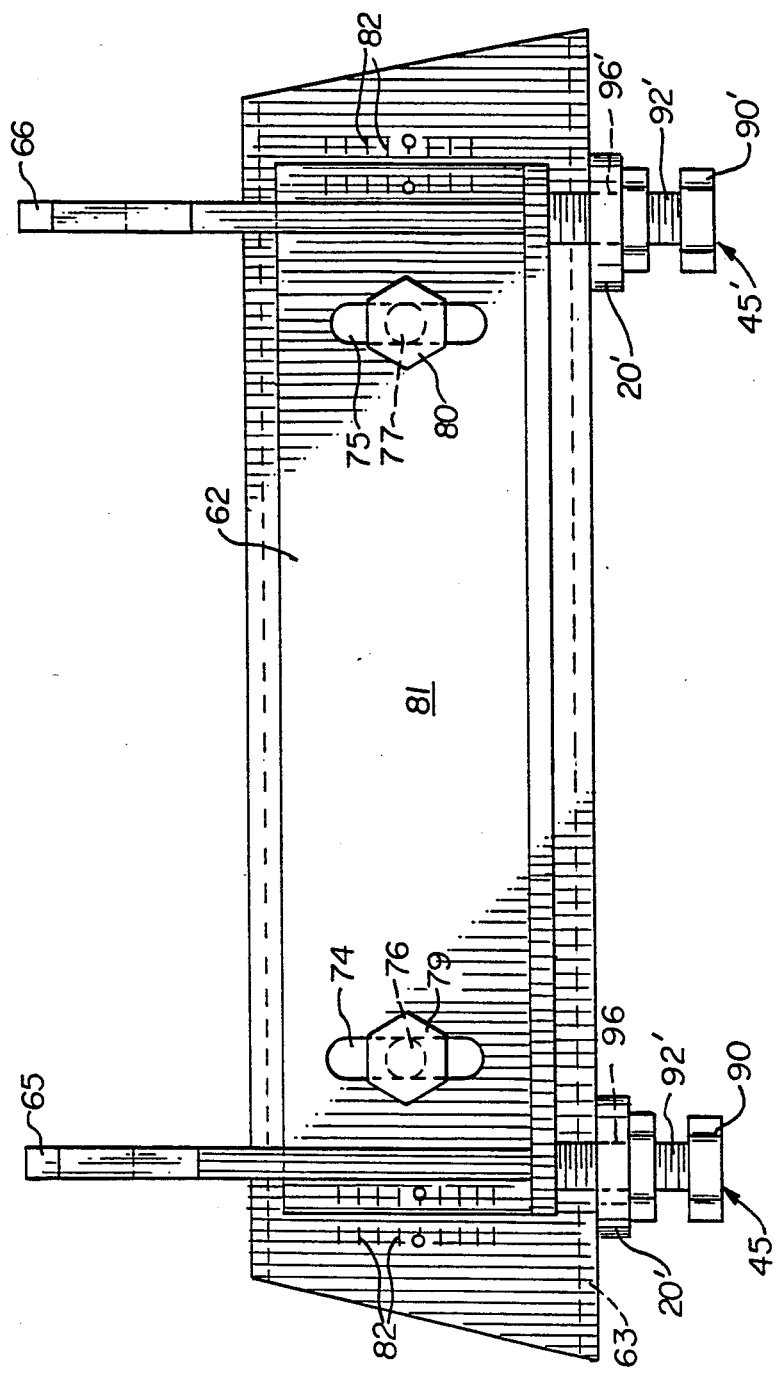
FIG. 5 is a partial front elevational view of the conveyor belt system showing the idler roller adjustability mechanism.

FIGS. 4 and 5 illustrate the adjustability aspect of the invention. The vertically oriented leg 62 is provided with slots 74,75 which allow for vertical movement of the adjustable idler roller support 58 with respect to the fixed elevation of the slider bed 30 (not shown). As can be seen in FIG. 4, the frame member 20' adjacent to the adjustable idler roller support 58 is equipped with protruding hex headed bolt 76,77. The hex headed bolt means 76 pass through the slot 75 of the adjustable idler roller support 58. The adjustable idler roller support 58 is then mounted on the hex headed bolt 76,77 by means of complimentary threaded nut means 79,80 which is tightened down to effect intimate engagement of the nut means 79,80 with the exterior surface 81 of the generally vertically oriented leg 62. The vertical leg 62 is also equipped with elevation set marks 82 which facilitate setting the elevation. It is to be noted that the tail idler roller 42 may have the exact same support and adjustability mechanisms.

FIG. 5 also shows the jack screws 45,45'. The jack screw 45 consists of base 90 threadedly attached to screw stand 92. Screw stand 92 passes through frame member 20' through hole 96 and intimately engages horizontal leg 63 of adjustable idler roller support 58.

Adjustability of the idler roller is accomplished as follows. With the idler roller 40 removed from the idler roller support 58, nuts 79,80 are loosened so that adjustable idler roller support 58 can move up or down in slots 74,75. As bracket 64 and support 28 are fixed, adjustable idler roller support 58 slides with respect to bracket 64. Then base 90 and screw stand 92 are adjusted, thus raising or lowering idler roller support 58. Once the jack screws 45,45' are in position, the nuts 79,80 are tightened down on hex head nut means 76,77. It is preferred to employ elevation set marks 82 to insure that the jack screws 45,45' are equally raised or lowered in order to prevent the conveyor belt 97 (described below) from slipping off the idler roller 40 while the system is in use.

Referring again to FIG. 1, the conveyor belt 97 is placed over the slider bed 30 and frictionally engages the idler rollers 40, 42. The belt 97, as can be seen in FIG. 1, has a central portion 98, and two angularly upwardly extending side portions 99 and 100. The central portion, 98 is designed to contact the idler rollers 40 and 42 and the side portions 99 and 100 create a trough that resists material falling off the belt 97. The slider bed 30 is preferably treated with a polyethylene, which wears off the slider bed 30 onto the belt 97. The frictional heat between the belt 97 and the slider bed 30 tends to cause a cross linking effect between the rubber and the polyethylene making a harder, more slippery undersurface on belt 97. In addition, the polyethylene may preferably be compounded with wear enhancers which lubricate the conveyor belt 97.

It will be appreciated that the method of the present invention involves providing a conveyor belt system having a frame 21, a slider bed 30 and head and tail idler rollers 40,42 both preferably disposed within recesses 41,43 in the slider bed 30 and mounted on a frame and placing a load of material (not shown) onto the conveyor belt 97. The conveyor belt 97 handles the load by means of the slider bed 30 supporting the conveyor belt 97 at the point where the load is placed on the conveyor belt 97. This action will resist undesired conveyor belt 97 sagging and stretching and will, in turn, increase the useful life of the conveyor belt 97.

Whereas a particular embodiment of the invention has been described above, for purposes of illustration, it would be evident to those skilled in the art that numerous variations of the details may be made without departing from the invention as defined in the appended claims.

I claim:

1. A conveyor belt system comprising
a frame,
an elongated slider bed secured to said frame,
said slider bed having slider bed members including a plurality of spaced elongated generally parallel members,
said slider bed members oriented generally longitudinally with respect to said frame,
said slider bed having recesses defined by said slider bed members at opposed ends thereof,
a head idler roller secured to said frame and disposed in one said recess,
a tail idler roller secured to said frame and disposed in the opposite said recess,
an endless conveyor belt extending over said idler rollers and said slider bed,
said slider bed being treated with polyethylene whereby said polyethylene is transferred onto said conveyor belt to create a cross-link effect between said conveyor belt material and said slider bed,
said idler rollers each being rotatably mounted on a shaft,
said shaft extending axially beyond the sides of said idler roller, and
said shaft of said idler roller mounted in adjustable idler roller support means which include a generally horizontally oriented base, a generally vertically oriented sidewall, and a pair of generally vertically oriented support plates relatively spaced a distance greater than the axial length of said idler roller and receiving said extending portion of said shaft, whereby impact loads imposed on said conveyor belt can be supported by said idler rollers and said slider bed.

2. The system of claim 1, including
said extending portion of said shaft having connected to it a roller bearing cup to effect fixation of said idler roller to said adjustable idler roller support means while permitting said idler roller to rotate.

3. The system of claim 2, including
jack screw means engaging said adjustable idler roller supports to facilitate raising or lowering said adjustable idler roller supports.

4. The system of claim 3, including
said generally vertically oriented sidewall having slots.

5. The system of claim 4, including
said frame consisting of a plurality of frame members, said adjustable idler roller support means being slidably attached to the opposed end frame members by bolt means and nut means whereby said bolt means pass through said slots in said generally vertically oriented sidewall and said nut means engaging said bolt means to effect intimate engagement of said nut means with the exterior surface of said vertically oriented sidewall so as to fix the position of said adjustable idler roller support.

6. An adjustability mechanism comprising a conveyor belt system having a frame, a slider bed secured to said frame, a head idler roller secured to and in recessed position with respect to said frame, a tail idler roller secured to and in recessed position with respect to said frame adjacent to the opposite end thereof, a conveyor belt having a central portion and angularly upwardly extending side portions, said central portion extending over and contacting said idler rollers and said slider bed,
an adjustable idler support means slidably attached to said frame of said conveyor belt system, and
said adjustable idler support means comprising a generally horizontally oriented base and a generally vertically oriented sidewall and a pair of vertically oriented support plates relatively spaced a distance greater than the axial length of said idler roller, whereby said head and tail idler rollers may be vertically adjustable with respect to said frame and said slider bed.

7. The mechanism of claim 6, including
said generally vertically oriented sidewall having slots.

8. The mechanism of claim 7, including
said frame consisting of a plurality of frame members, the opposed end frame member being slidably attached to said adjustable idler roller support means by nut means and bolt means whereby said bolt means pass through said slots in said generally vertically oriented sidewall and said nut means engaging said bolt means to effect intimate engagement of said nut means with the exterior surface of said vertically oriented sidewall so as to fix the position of said adjustable idler roller support.

9. The system of claim 8, including
jack screw means engaging said adjustable idler roller supports.

* * * * *

UNITED STATES PATENT AND TRADEMARK OFFICE
CERTIFICATE OF CORRECTION

PATENT NO. : 4,789,056
DATED : December 6, 1988
INVENTOR(S) : ROBERT D. BOURBEAU It is certified that error appears in the above-identified patent and that said Letters Patent is hereby corrected as shown below:

In Figure 1, reference numerals 99, 98 and 100 should be inserted in the top center of the drawing.

In Figure 5, the reference numeral "92'" on the left-hand side of the drawing should be --92--.

Signed and Sealed this

Twenty-seventh Day of June, 1989

*Attest:*

DONALD J. QUIGG

*Attesting Officer*  *Commissioner of Patents and Trademarks*